United States Patent [19]

Steiger

[11] Patent Number: 4,825,842

[45] Date of Patent: May 2, 1989

[54] FUEL INJECTION SYSTEM

[75] Inventor: Anton Steiger, Illnau, Switzerland

[73] Assignee: Sulzer Brothers Limited, Winterthur, Switzerland

[21] Appl. No.: 160,852

[22] Filed: Feb. 26, 1988

[30] Foreign Application Priority Data

Mar. 17, 1987 [CH] Switzerland .................. 01013/87

[51] Int. Cl.⁴ ............................................. F02M 39/00
[52] U.S. Cl. .................................... 123/575; 123/300; 123/23; 123/447
[58] Field of Search .............. 123/299, 300, 575, 576, 123/577, 447, 506, 23

[56] References Cited

U.S. PATENT DOCUMENTS

| | | | |
|---|---|---|---|
| 4,520,774 | 6/1985 | Sitter | 123/300 |
| 4,590,903 | 5/1986 | Hofmann | 123/575 |
| 4,590,904 | 5/1986 | Wannenwetsch | 123/575 |
| 4,612,905 | 9/1986 | Deitrich | 123/575 |
| 4,662,315 | 5/1987 | Sommer | 123/23 |
| 4,674,448 | 6/1987 | Steiger | 123/23 |
| 4,693,227 | 9/1987 | Satou | 123/575 |
| 4,705,010 | 10/1987 | Barenescu | 123/575 |

Primary Examiner—Carl Stuart Miller
Attorney, Agent, or Firm—Kenyon & Kenyon

[57] ABSTRACT

The fuel injection system employs a relief valve which is connected to the fuel chamber in the injection valve containing the primary fuel. The relief valve opens towards the end of the primary fuel injection phase to connect the fuel chamber to a discharge duct. Further, the relief valve permits a flushing of the fuel chamber after a changeover from operation with a coal slurry suspension to operation with diesel oil as the primary fuel. A selector valve, a pair of three way valves and multiple reservoirs are provided to accommodate switching over of operation from coal slurry to diesel oil.

16 Claims, 3 Drawing Sheets

FUEL INJECTION SYSTEM

This invention relates to a fuel injection system. More particularly, this invention relates to a fuel injection system for a combustion chamber of a reciprocating internal combustion engine. Still more particularly, this invention relates to a fuel injection system for injecting diesel oil as an ignition oil and for injecting a separate primary fuel.

As is known, various types of fuel injection systems have been known for the injection of fuel into a combustion chamber of an internal combustion engine. In some cases, the fuel injection systems have been provided with injection valves for injecting a primary fuel consisting of a suspension of finely divided solid fuel particles in a liquid or in a diesel or heavy oil. For example, the primary fuel may comprise petroleum coke or coal which is ground to very fine particles between 5 and 20 $\mu$m and which is suspended in water or oil or with injection valves for the injection of an ignition oil such as diesel oil into the combustion chamber. Generally, the injection valve for the ignition oil has had at least one spray opening which is controlled by a valve needle and which communicates with an accumulator chamber for receiving the diesel oil at an injection pressure at least equal to the injection pressure of the primary fuel.

Hitherto the suspension, also known as coal slurry, has been injected by "accumulation injection" (alternatively termed time-dependent injection), whereas the ignition oil has been injected both on the positive displacement principle and by time-dependent injection. The latter method of injection has distinct advantages over the classic positive displacement principle, viz. a very precisely controlled injection characteristic as regards the pressure/time diagram, permitting a substantially rectangular form. Not only the moment of injection, but also the duration of injection can be precisely determined. In addition, the duration of injection can be limited to fractions of milliseconds, which is particularly useful for ignition oil injection.

U.S. patent application Ser. No. 160,854, filed Feb. 26, 1988 describes a fuel injection system wherein an injection valve for a primary fuel is constructed on the positive displacement principle while the injection valve for an ignition oil cooperates with an accumulator chamber for receiving ignition oil at a pressure at least equal to the injection pressure of the primary fuel. Such a fuel injection system largely fulfills the demands generally made on a reciprocating internal combustion engine of the diesel type during operation. However, in special cases, the demands made on the injection system cannot be fulfilled. For example, such cases occur when there is no operation with diesel oil as the primary fuel, probably due to limiting operational conditions, or when the engine must be switched off under a very small load or in an emergency while, in both cases, operating on a suspension as the primary fuel.

Accordingly, it is an object of the invention to provide a fuel injection system in which a coal slurry can be used as a primary fuel and in which a diesel oil can be used for ignition oil as well as to satisfy special demands of the engine.

It is another object of the invention to be able to switch from a coal slurry to a diesel oil as a primary fuel in special conditions of operation of an internal combustion engine.

Briefly, the invention provides a fuel injection system for a combustion chamber of a reciprocating internal combustion engine which is comprised of a first injection valve having a plurality of spray openings for injecting a primary fuel containing a suspension of solid fuel particles into the combustion chamber and a second injection valve having at least one spray opening for injecting diesel oil into the combustion chamber for ignition of the primary fuel. In addition, the system includes an accumulator chamber for receiving diesel oil at an injection pressure at least equal to an injection pressure of the primary fuel. This chamber is in communication with the second injection valve for delivering the oil to the spray opening thereof. Further, a supply duct communicates with the first injection valve for delivering primary fuel to a fuel chamber upstream of the openings of the valve, a cylinder in the supply duct to receive the primary fuel and a hydraulically operated piston in the cylinder for expelling primary fuel from the cylinder into the fuel chamber of the first injection valve for injection from the spray openings thereof during an injection phase.

In accordance with the invention, a relief valve communicates with the fuel chamber of the first injection valve and is selectively disposed in one of a closed position to block a flow of primary fuel from the fuel chamber and an open position, towards an end of the injection phase, to exhaust a flow of primary fuel from the fuel chamber. A discharge duct also extends from the relief valve for discharging primary fuel from the relief valve.

During a changeover of the engine from operation with a suspension to operation with diesel oil, or heavy oil, as a primary fuel, the relief valve also temporarily acts as a flushing valve.

The relief valve is disposed as close as possible to the injection valve for the primary fuel. Thus, at the end of an injection phase, the relief valve is able to relieve the pressure abruptly in the fuel chamber inside the injection valve in order to allow the expansion volume of the primary fuel to flow into the discharge duct. The temporary role of the relief valve as a flushing valve has the advantage that after a change to diesel or heavy oil operation, the space previously exposed to the suspension is flushed by the diesel or heavy oil after every injection cycle. The abrupt pressure relief is also desirable in order to improve the combustion properties of the primary fuel in the combustion chamber of the engine, particularly with respect to fumes. Another particular advantage is that the abrupt pressure relief is effected without any additional structural outlay.

These and other objects and advantages of the invention will become more apparent from the following detailed description taken in conjunction with the accompanying drawings wherein:

Figure 1:
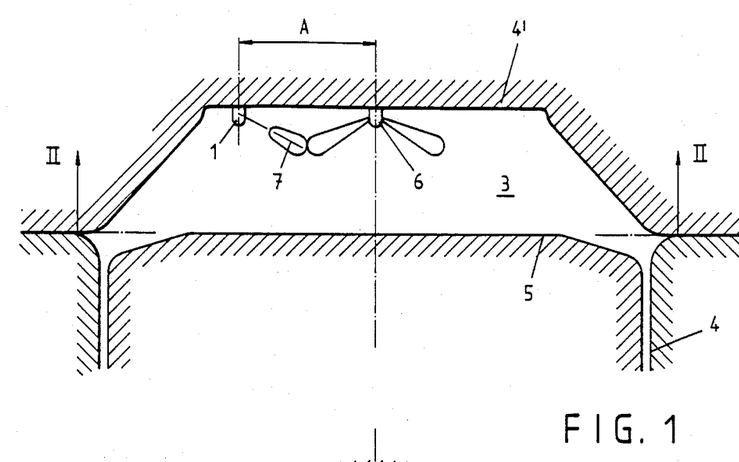
FIG. 1 illustrates a diagrammatic view of a combustion chamber of a reciprocating internal combustion for primary fuel and ignition oil.
Figure 2:
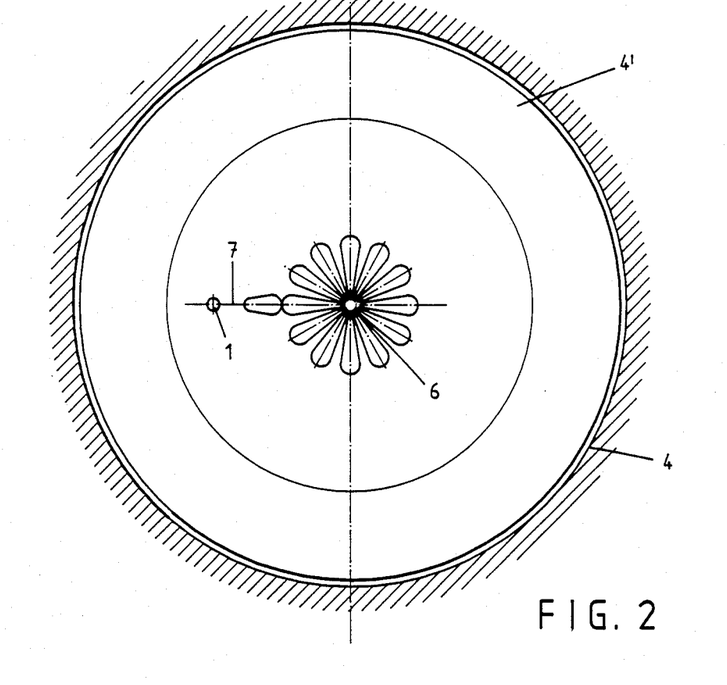
FIG. 2 illustrates a view taken on line II—II of FIG. 1.

Referring to FIGS. 1 and 2, the combustion chamber 3 which is one of several of a reciprocating internal combustion engine of the diesel type, is defined essentially by a cylinder head 4' and by a working piston 5. The piston 5 is movable up and down, as viewed, in a cylinder 4 and is shown in a top dead center position in FIG. 1. An injection valve 6 for primary fuel projects from the cylinder head 4' into the valve 1 projects at a lateral distance A into the chamber 3 to inject ignition oil for igniting the primary fuel. As indicated in FIG. 2, the injection valve 6 for the primary fuel has a plurality of spray openings, for example, twelve which are equally spaced around the axis of the valve. The injection valve 1 for the ignition oil has one spray opening disposed on an axis 7 and directed towards the injection valve 6 for the primary fuel. The number of spray openings in the injection valve 1 may vary between one and three with the axis of any further opening being directed towards the injection valve 6.

Figure 3:
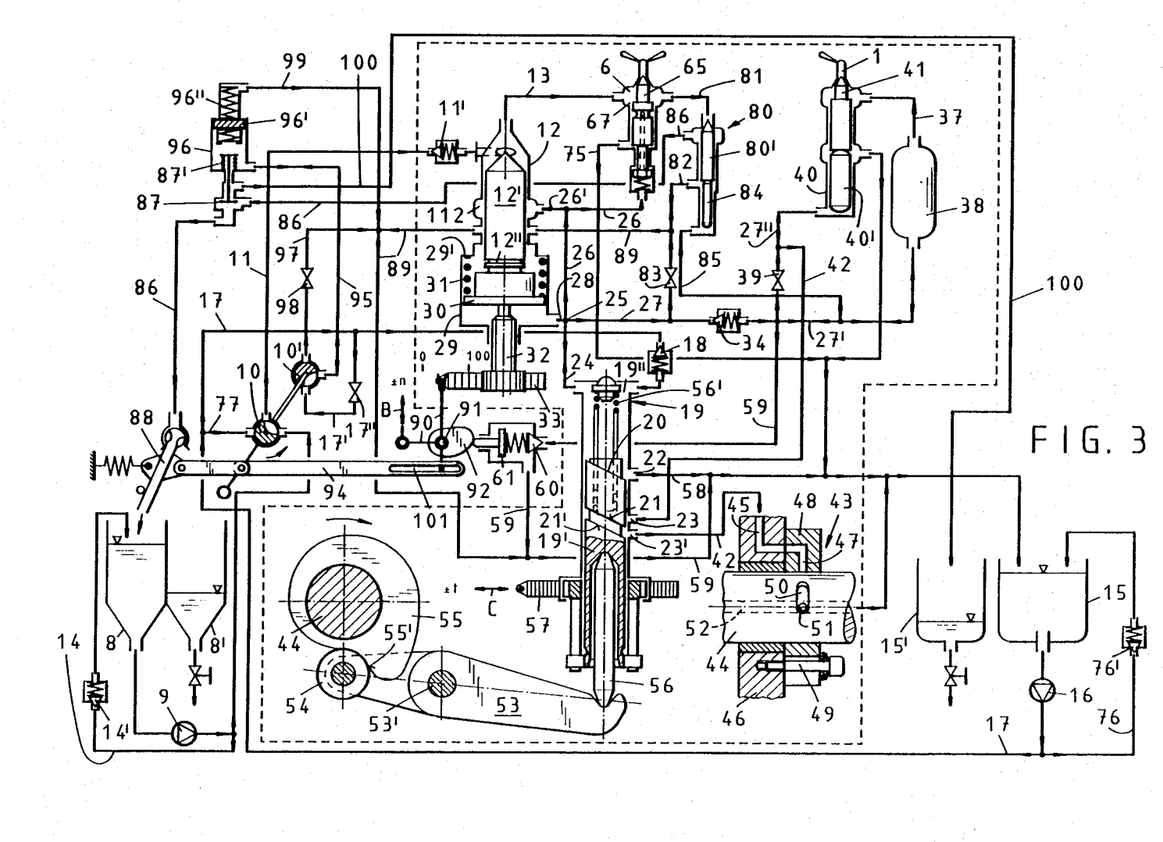
FIG. 3 illustrates a diagrammatic view of a fuel injection system constructed in accordance with the invention.

Referring to FIG. 3, the fuel injection system has a supply reservoir 8 for primary fuel, for example, a coal slurry, which is connected to a slurry pump 9. The pump 9, in turn, delivers the primary fuel by way of a three-way valve 10 and a supply duct 11 tangentially into a cylinder 12 as well as into a supply duct 13 leading to the injection valve 6 for primary fuel. The duct 11 extends tangentially of the cylinder 12 in order to impart a rotary flow of the incoming fuel into the cylinder 12. A hydraulically operated piston 12' is also reciprocally mounted in the cylinder for pressurizing and expelling the primary fuel from the cylinder 12 in the injection valve 6. A suction valve 11' is also provided at the fuel inlet to the cylinder 12 to prevent a backflow of primary fuel in the supply duct 11.

As indicated in FIG. 3, the supply duct 13 is very short in order to minimize the volume of fuel enclosed. In addition, an overflow duct 14 is provided between the pump 9 the three-way valve 10 along with a pressure control valve 14' for a return flow of coal slurry to the supply reservoir 8.

The fuel injection system also includes a supply reservoir 15 for diesel oil. This reservoir 15 is connected to a diesel oil pump 16 which feeds the oil through a duct 17 and suction valve 18 to a cylinder chamber 19" of a high pressure pump 19. This pump 19 has a piston 19' which is movable up and down, as viewed and which has an oblique control edge 20 on an end face facing the chamber 19" and a control groove in a central portion of the piston 19'. This control groove is defined by an upper control edge 21 and a parallel lower control edge 21'. The edge 20 cooperates with an upper control aperture 22 in the cylinder wall of the pump 19 whereas the edges 21, 21' cooperate with a central control aperture 23 and lower control aperture 23' in the cylinder wall.

A duct 24 leads from the chamber 19" of the pump 19 to a branch point 25 from which a duct 26 leads to the injection valve 6 while a branch duct 26' leads to an annular chamber 112 in the wall of the cylinder 12. In addition, a second duct 27 extends to the injection valve 1 for the ignition oil and a third duct 28 extends to an operating cylinder 29 for the piston 12'. Thus, the diesel oil is used to drive the piston 12' hydraulically while also serving to close the injection valve 6 and to operate the injection valve 1 as further described below.

By means of the hydraulically operated piston 12', the two media (primary fuel and diesel oil) are separated from one another. Further, the pressure of the diesel oil is always maintained somewhat higher than that of the primary fuel so that a small flow of diesel oil occurs from the annular chamber 112 towards the feed chamber. Thus, no coal particles can settle in the gap between the piston 12; and the surrounding wall of the cylinder 12. As indicated, the driven side of the piston 12' forms a disk 30 which is connected to the piston. This disk 30 is subjected from below to the pressure of the diesel oil and from above to the force exerted by a return spring 31 housed in the cylinder 29. The upward stroke of the piston 12' is limited by a stop 29' at a transition from the cylinder 29 to the cylinder 12. The downward stroke of the piston 12' is limited by an adjustable stop screw 32 which projects in the operating cylinder 29 from below. The head of the stop screw 32 is in the form of a pinion which meshes with a rack 33 which is axially adjustable between positions "0" and "100" according to the speed (n) of the reciprocating engine so that the extent to which the screw 32 extends into the operating cylinder 29 and, hence the stroke of the piston 12', are variable.

The duct 27 which communicates with the injection valve 1 contains a non-return valve 34 and branches into two branch duct 27', 27". The first branch duct 27' leads to an accumulator 38 in which ignition oil for injection is stored at injection pressure and which is connected by a duct 37 to the injection valve 1. The second branch duct 27" contains a fixed throttle 39 and leads to a cylinder 40 containing a loading piston 40' for a valve needle 41 of the injection valve 1. A control duct 42 branches off from the duct 27'" between the cylinder 40 and the fixed throttle 39 and extends to the central control aperture 23 of the high-pressure pump 19. Starting from the lower control aperture 23' of this pump, the control duct 42 continues to a rotary valve 43, which is situated on a camshaft 44 for indirectly driving the piston 19' of the high-pressure pump 19. The control duct 42 leading to the rotary valve 43 ends in a first angled duct 45 formed in a bearing block 46 for the camshaft 44. The other end of this angled duct 45 communicates with a second angled duct 47 formed in a disc 48 mounted on the camshaft 44 and attached by a screw 49 to the bearing plate 46. In the region of the outlet from the angled duct 47, there is a groove 50 in the camshaft 44, extending over a relatively short portion of the periphery of the camshaft and leading at one end into a transverse bore 51 in the camshaft 44. This bore 51 communicates with a discharge bore 52 extending along the center of the camshaft. When the camshaft 44 is in the position shown in FIG. 3, therefore, the ducts 45, 47 do not communicate with the groove 50 and the discharge bore 52 so that diesel oil in the control duct 42 cannot reach the discharge bore 52.

The indirect drive for the piston 19' of the high pressure pump 19 by way of the camshaft 44 includes an asymmetrical lever 53 which is pivotally mounted on a pin 53' and which carries a roller 54 on one end to cooperate with a cam 55 mounted to rotate with the camshaft 44. The opposite end of the lever 53 is supported by a ram 56 in the piston 19'. A compression spring 56' is housed in the chamber 19" and ensures that the piston 19' and lever 53 are positively connected, that is, the spring 56' biases the piston 19' against the ram 56. Because the piston 19' is operated by way of the lever 53, a more favorable delivery characteristic is possible than with conventional direct cam shaft operation. In this respect, the lifting speed of the piston can be higher. The lift of cam for a given piston stroke is therefore smaller so that the cam ramp 55' can be steeper, that is, the same piston stroke can be produced with a smaller cam angle without risk of jamming. The use of a lever, as opposed to a ram and roller, reduces friction. This again allows the steepness of the cam ramp 55' to be increased. The use of the ram 56 which is of rod-like construction reduces friction during turning of the piston 19'.

The lower end of the piston 19' as viewed is provided with a pinion meshing with a rack 57, which is movable in the direction of a double arrow C and determines the time (t) for injection. An overflow duct 58 connected to the upper control aperture 22 of the high pressure pump leads back to the supply reservoir 15 for diesel oil.

The high-pressure pump 19 begins to feed diesel oil to the duct 24 when, during the upward stroke of the piston 19', the control edge 20 has completely covered the upper control aperture 22. During the downward stroke of the piston 19', diesel oil flows out of the duct 17 by way of a the suction value 18 to replenish the cylinder chamber 19" of the pump.

From the branch duct 27' of the ignition oil injection system, a discharge duct 59 branches off downstream of the non-return valve 34 and leads by way of a valve 60 regulating the discharge pressure into the overflow duct 58 leading to the discharge reservoir 15. The discharge pressure controlled by the regulating valve 60, which is also the pressure in the accumulator 38, can be varied by changing the spring tension in the valve 60.

In order to adjust the stop screw 32, the rack 33 is slidable between the positions "0" and "100", this being effected by way of a linkage 90 which is pivotally mounted on a pin 91 as indicated by the double arrow B. In addition, a Càm disc 92 is rigidly connected to the linkage 90 to cooperate with a spring abutment 61 in the regulating valve 60. The disc 92 also has a curve portion which is designed so that, during normal operation of the engine with coal slurry, the spring tension for the valve 60 is adapted to the quantity of primary fuel disc 92 also has a curved portion which, in the zero position, ensures that when the engine is off and the diesel oil pump 16 is still operating, the pressure in the accumulator chamber 38 is substantially below the minimum injection pressure so that the flushing process can be maintained.

Figure 4:
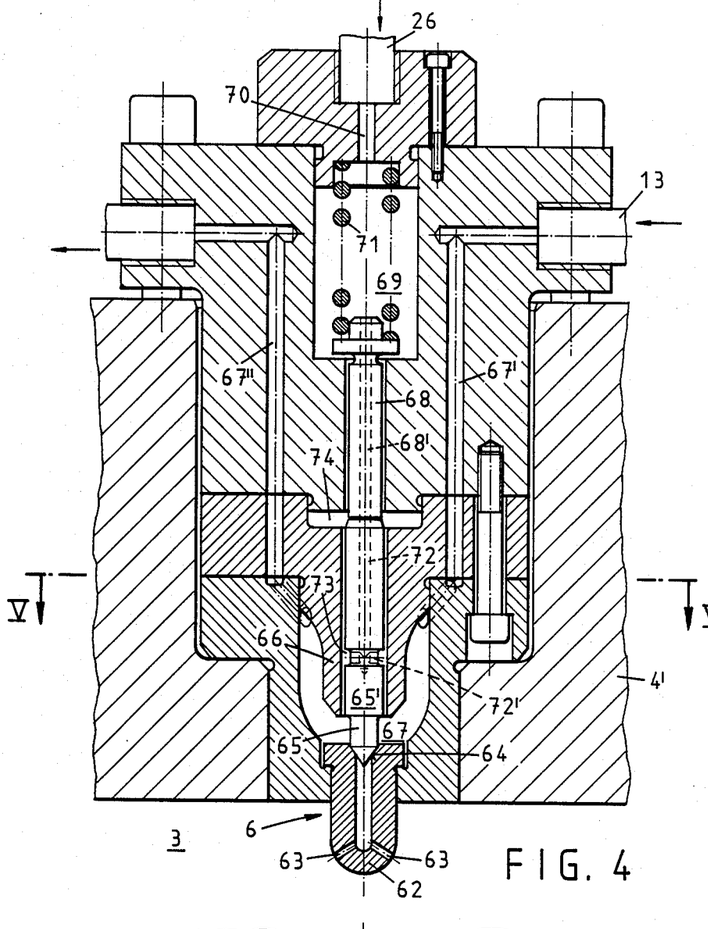
FIG. 4 illustrates an axial sectional view through an injection valve for the primary fuel in accordance with the invention.
Figure 5:
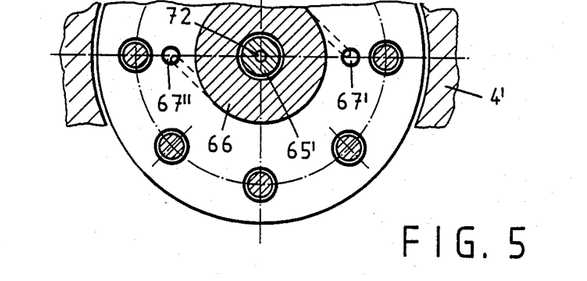
FIG. 5 illustrates a view taken on line V—V of FIG. 4.

Referring to FIG. 4, the injection valve 6 for primary fuel, situated in the cylinder head 4', has a nozzle head 62 containing a plurality of spray openings 63 directed into the combustion chamber 3. The upper end of the nozzle head 62, as viewed, has a conical seat 64 for a valve needle 65, of which the stem 65' is mounted in a guide 66. A space 67 about the needle 65 between the nozzle head 62 and guide 66 serves as a fuel chamber and is filled with primary fuel for injection, which is supplied along the duct 13 and a communicating duct 67' of which the lower portion leads tangentially into the space 67. Similarly, the lower portion of a discharge duct 67" is directed tangentially towards the space 67. This produces a rotary flow of primary fuel in the space 67 improving flushing of the space 67.

A plunger 68 is disposed above and coaxial with the stem 65' as viewed. This plunger 68 is smaller in diameter than the stem 65' and has an upper end which extends into a pressure camber 69. The pressure chamber 69, in turn, communicates via a duct 70 with the duct 26 for supplying high-pressure diesel oil as a pressure medium from the high-pressure pump 19 (see FIG. 3). This pressure medium therefore acts by way of the plunger 68 to bias the valve needle 65 into a seated position on the valve seat 64 to close the valve 6. The closing pressure is supplemented by a compression spring 71 housed in the pressure chamber 69 and bearing on a shoulder on the plunger 68.

The plunger 68 contains an axial bore 68' which continues through part of the stem 65' as a blind axial bore 72. The bottom end of the blind bore 72 communicates by way of a transverse bore 72' with an annular groove 73 in the stem. Diesel oil at high pressure flows along the bores 68', 72 and 72' into the annular groove 73, from which some of the oil passes as sealing oil along the gap between the valve stem 65' and guide 66 to the chamber 67 filled with primary fuel, thus preventing fine coal particles from the primary fuel from penetrating into this gap. Such penetration by solid particles might lead to jamming of the valve needle 65. Other diesel oil from the annular groove 73, moreover, flows upwards along the gap between the upper portion of the stem 65' and the guide 66 into a space 74 and then by way of a leakage duct (not shown) to a communicating discharge duct 75 (FIG. 3) which leads back to the supply reservoir 15.

Referring to FIG. 3, an overflow duct 76, analogous to the overflow duct 14 and having a pressure control valve 76', is connected downstream of the diesel oil pump 16. Between the duct 17 from the diesel oil pump and the three-way valve 10, moreover, there is a duct 77, which is blocked when the valve 10 is in the position shown in FIG. 3.

Referring to FIG. 3, a relief valve 80 in the immediate vicinity of the injection valve 6 for primary fuel is connected by a duct 81 to the space 67 in the valve 6. The valve 80 includes a needle 80' which is exposed on an end face remote from a valve seat to the high pressure of the diesel oil delivered by the piston 19', the relief valve 80 being connected to a connecting line or duct 82 which branches off the duct 27 upstream of the non-return valve 34 and which contains a fixed throttle 83. The cross-section of the valve needle 80' is some 20% greater than the seat cross-section of the relief valve, so that even if the pressures on both sides of the valve needle 80' are equal, a considerable closing force acts on the needle 80'. That end of the needle 80' exposed to the diesel oil is also subjected to a loading piston 84, which is smaller in diameter than the needle 80' and whose end face remote from this needle is exposed to the pressure of the diesel oil in the duct 27', by way of a duct 85 in parallel to the accumulator chamber 38. A discharge duct 86 extends from a point downstream of the seat of the relief valve 80 and leads by way of a selector valve 87 and swing pipe 88 to the supply reservoir 8.

An annular groove 12" in the lower end of the piston 12' communicates with two apertures in the wall of the cylinder 12 when the piston 12' is in the upper limit position (i.e. closed position). A relief duct 89 connected to these two apertures branches off the duct 82 between the fixed throttle 83 and the relief valve 80, and leads downstream of the regulating valve 60 into the discharge duct 59, which leads back to the supply reservoir 15.

The selector valve 87 and swing pipe 88 are in the position shown in FIG. 3 when the engine is running on coal slurry as primary fuel. For operation with diesel oil, the swing pipe 88 is pivoted to the right in FIG. 3 by means of a coupling linkage 94, so that the flushing mixture which then arrives through the discharge duct 86—and which consists of slurry increasingly enriched with diesel oil—is passed to a collecting reservoir 8' beside the supply reservoir 8. The coupling linkage 94 is coupled to the three-way valve 10 to effect a changeover. In addition, to the valve 10, a second three-way valve 10' is provided, which is coupled to the valve 10 by suitable means, such as a common shaft, for simultaneous operation and which, in the position shown in FIG. 3 connects a duct 17' communicating with the duct 17 to a duct 95 by way of a fixed throttle 17". The duct 95 leads to a cylinder 96 in which a spring-biased selector piston 96' is slidable. A duct 97 connected to the third connection point in the second three-way valve 10' contains a fixed throttle 98 and leads to the discharge duct 89. A leakage duct 99, connected to the cylinder 96 above the selector piston 96' in FIG. 3, also leads to the discharge duct 89.

The selector valve 87 is connected above the connection point for the discharge duct 86 in FIG. 3—to a duct 100 leading to a collecting reservoir 15' trapping the diesel oil, which may still contain small quantities of coal particles. The coupling linkage 94 contains a slot 101 by way of which the linkage 94 is connected to the linkage 90.

Parts within the broken line in FIG. 3 are duplicated for each cylinder 4 (FIG. 1) of the internal combustion engine.

The injection device described operates as follows.

By means of the slurry pump 9, coal slurry is pumped out of the supply reservoir 8 and along the duct 11 into the cylinder 12, the duct 13 and the space 67 surrounding the valve needle 65 in the injection valve 6 as well as into the duct 81 of the relief valve 80. Any coal slurry supplied in excess of that required to fill these components is fed back along the overflow duct 14 to the reservoir 8.

By means of the diesel oil pump 16, diesel oil is fed along the duct 17 to the high-pressure pump 19.

Injection of coal slurry and ignition oil is accomplished jointly for both substances by the high-pressure pump 19. As the camshaft 44 turns, the lever 53 moves the piston 19' upwards by way of the ram 56. The high-pressure supply of diesel oil to the ducts 24, 26, 27, 28 begins at the instant the control edge 20 completely covers the upper control aperture 22 The diesel oil at high pressure passes along the duct 28 into the operating cylinder 29 as well as along the ducts 27 and 82 to the valve needle 80' of the relief valve 80. The oil in the cylinder 29 and urges the piston 12' upwards, as viewed, so that the coal slurry in the cylinder 12, in the duct 13 and in the space 67 in the injection valve 6 is exposed to a pressure high enough to overcome the closing pressure which is exerted on the valve needle 65 by way of the compression spring 71 and the diesel oil in the pressure chamber 69 (FIG. 4). The valve needle 65 therefore lifts off the seat 64 and allows coal slurry to flow into the spray openings 63, from which the slurry squirts into the combustion chamber.

Towards the end of the injection stroke of the piston 12', the annular groove 12" runs over the two connecting apertures for the relief duct 89. The pressure on the underside of the valve needle 80' is then relieved practically to atmospheric pressure. In this condition, the force acting on the seat of the needle 80' is substantially greater than the force exerted by the loading piston 84 since the dimensions of the two cross-sections are selected accordingly. As a result, the needle 80' lifts off the seat abruptly. The valve needle 65 therefore closes very rapidly and a flow of coal slurry is established from the space between the suction valve 11' and the relief valve 80 into the discharge duct 86. The quantity of slurry corresponding to this expansion volume is passed to the supply reservoir 8 after every injection stroke. As soon as the pressure in the space 67 has dropped enough, the closing force of the loading piston 84 again predominates and the valve needle 80' returns to the closed position.

The diesel oil supplied by the high-pressure pump 19 also passes by way of the non-return valve 34 and ducts 27, 27' to the accumulator 38, bringing the accumulator 38 to the required pressure and to the bottom of the loading piston 40'. This pressure is determined by means of the regulating valve 60 in the discharge duct 59 any surplus delivered by the piston 19' being discharged via this valve. As soon as the piston 19' begins the downward stroke, there is a drop in pressure in the cylinder chamber 19" and hence also in the chamber of the operating cylinder 29 below the disc 30, to the pressure (somewhat higher than the delivery pressure of the slurry pump 9) determined by the diesel oil pump 16. In spite of this pressure difference, the piston 12' is moved downwards by means of the return spring 31 until the piston 12' bears on the stop screw 32.

During this downward motion, the cylinder 12, the duct 13 and the space 67 in the injection valve 6 and the duct 81 are refilled with primary fuel by way of the suction valve 11'. The injection dose can be varied according to the speed of the reciprocating engine by adjusting the rack 33 and so changing the position of the stop screw 32 relative to the operating cylinder 29.

Whereas injection of the primary fuel is on the positive displacement principle, injection of the ignition oil is controlled in dependence on time. The loading piston 40' (FIG. 3) which acts on the valve needle 41 of the injection valve 1 is supplied in the idle condition by way of the fixed throttle 39 with diesel oil at the pressure prevailing in the accumulator 38. Because the piston 40' is larger in diameter than the valve needle 41, therefore, the loading piston 40' holds the needle 41 closed. To lift the needle 41, the closing pressure acting on the piston 40' is relieved, this being effected by way of the control duct 42. When, during the upward stroke of the piston 19', the control edge 21 simultaneously exposes the central and lower control apertures 23 and 23', these two apertures are briefly connected. This connection is then interrupted when the control edge 21' completely covers the lower aperture 23'. During this upward stroke of the piston 19', also, the ducts 45 and 47 are connected continuously to the groove 50 and to the bores 51, 52 in the camshaft 44. During the brief period in which the control apertures 23 and 23' are connected, therefore, diesel oil flows along the control duct 42 to the discharge bore 52, so that for the duration of this brief connection, the pressure on the loading piston 40' is relieved. Consequently, the pressure of the diesel oil in the accumulator 38 prevails, with the result that the valve needle 41 briefly lifts and allows a corresponding jet of ignition oil into the combustion chamber 3. Although the control apertures 23, 23' are also briefly connected during the downward stroke of the piston 19', this has no effect on the injection valve 1, since the groove 50 in the camshaft 44 does not, at that time, communicate with the duct 47. During the downward stroke of the piston 19, therefore, the injection valve 1 remains closed, because there is no pressure relief at the loading piston 40'.

If the internal combustion engine is to be operated using diesel oil as the primary fuel, the three-way valve 10 is pivoted counter-clockwise until the duct 11 is connected to the duct 77 downstream of the diesel oil pump 16, breaking the connection between the duct 11 and slurry pump 9. Diesel oil is then injected as described through the injection valve 6 into the combustion chamber as primary fuel, while the diesel oil injected through the valve 1 assumes the character of a pre-injection.

The relief valve 80 initially fulfills the additional function of a flushing valve, in that the diesel oil discharged whenever the relief valve 80 opens carries away along the discharge duct 86 some of the coal slurry left over from slurry operation in the space between the three-way valve 10 and relief valve 80. At the same time as the three-way valve 10 is pivoted, the swing pipe 88 is pivoted to the right to bring its mouth over the reservoir 8' in which the mixture coming from the relief valve 80, which consists increasingly of coal slurry enriched with diesel oil, is collected.

In addition, with the pivoting of the three-way valve 10, the second three-way valve 10' pivots counter-clockwise, connecting the duct 95 to the duct 97, while the previous connection between the duct 17' and duct 95 is interrupted Because the valve 10' has changed over, the diesel oil below the selector piston 96' in FIG. 3 now flows gradually along the ducts 95, 97 to the relief duct 89, until finally the selector piston brings the selector valve 87 into the lower position in FIG. 3. This delayed repositioning of the selector valve 87 occurs because the throttle 98 in the duct 97 is designed so that the selector piston 96', under the influence of the upper spring 96", does not act on the selector valve 87 until the flushing of the space previously exposed to the coal slurry, downstream of the three-way valve 10, is substantially complete. Then only substantially pure diesel oil flows from the relief valve 80 back along the discharge duct 86. Moving the selector valve 87 into the lower position has the result that the diesel oil coming from the relief valve 80 is diverted to the duct 100 and then passes along this duct 100 into the collecting reservoir 15'.

If the primary fuel is now to be changed in the opposite direction, that is, from operation with diesel oil as the primary fuel to operation with coal slurry, which is done in FIG. 3, the simultaneous moving of the three-way valve 10' has the effect of reconnecting the duct 17' by way of the fixed throttle 17" to the duct 95. The selector piston 96' therefore moves slowly upwards, so that after a suitable time delay, the selector valve 87 returns to the upper position in FIG. 3 under the influence of the spring 87'. With the return of the coupling linkage 94, the swing pipe 88 immediately returns to the position leading to the supply reservoir 8. However, the fuel coming from the relief valve 80 flows, at first, back to the collecting reservoir 15', since the selector valve 87 does not switch the discharge duct 86 from the duct 100 to the swing pipe 88 until somewhat later.

As already mentioned, the cam disc 92 has a portion which, when the rack 33 is in the Zero position, ensures that the pressure in the accumulator chamber 38 when the engine is switched off substantially below the minimum injection pressure. Because of this lower pressure in the accumulator chamber 38, the closing force acting on the loading piston 84 is always less than the opening force at the needle 80' of the relief valve, so that this needle 80' is permanently open. This has the effect that after the engine is switched off and the three-way valves 10, 10' are switched over from coal slurry to diesel oil operation, diesel oil flushes through the highs pressure system until the diesel oil pump 16 is switched off. In this way, satisfactory flushing is ensured even in cases where the engine must be switched over to diesel operation while under a very small load, or when the engine must suddenly be switched off without being previously switched over to diesel operation (that is, emergency switch-off).

In the event of an emergency switch-off, a change-over from coal slurry to diesel oil operation is effected automatically when the engine is switched off. To this end, when pivoted into the position "0", the linkage 90 entrains the coupling linkage 94 via the slot 101, that is, the linkage 90 moves counter-clockwise in FIG. 3 and moves the coupling linkage 94 to the right. That curved portion of the cam disc 92 belonging to the position "0" then, as already explained above, causes the valve needle 80' of the relief valve 80 to enter the open position, so that, until the diesel oil pump 16 is turned off, flushing occurs in the high-pressure system previously filled with coal slurry.

The length of the slot 101 in the coupling linkage 94 17 is such that the three-way valves 10, 10' can readily be changed over by hand from operation with coal slurry to operation with diesel oil as the primary fuel, irrespective of the load on the engine.

In the injection device described, the relation between the moment of injection for the primary fuel and that for the ignition oil is fixed, since this relation is determined by the control apertures 22, 23 and 23' and the parallel arrangement of the associated control edges 20, 21 and 21'. In addition, the duration of ignition oil injection is constant.

The invention thus provides a fuel injection system which not only permits the use of a coal slurry as a primary fuel without hardening occurring but also permits operation of the engine under special conditions. For example, the invention permits the engine to be switched from a coal slurry operation as the primary fuel to the use of a diesel oil as the primary fuel.

What is claimed is:

1. A fuel injection system for a combustion chamber of a reciprocating internal combustion engine comprising a first injection valve having a plurality of spray openings for injecting a primary fuel into the combustion chamber, a valve seat and a valve needle seated on said valve seat and movable from said valve seat during an injection phase to control flow from a fuel chamber about said valve needle through said spray openings;

a second injection valve having at least one spray opening for injecting an ignition oil into the combustion chamber and a valve needle for controlling flow through said one spray opening;

an accumulator chamber for receiving ignition oil at an injection pressure at least equal to an injection pressure of the primary fuel, said chamber being in communication with said second injection valve for delivering ignition oil to said one spray opening;

a supply duct communicating with said first injection valve for delivering primary fuel thereto;

a cylinder in said supply duct to receive primary fuel therein;

a hydraulically operated piston in said cylinder for expelling primary fuel from said cylinder into said first injection valve for injection from said plurality of spray openings during said injection phase;

a relief valve communicating with said fuel chamber of said first injection valve, said relief valve being selectively disposed in one of a closed position to block a said fuel chamber and an open flow of primary fuel from position towards an end of said injection phase thereof to exhaust a flow of primary fuel from said fuel chamber; and a discharge duct extending from said relief valve for discharging primary fuel from said relief valve.

2. A fuel injection system as set forth in claim 1 wherein said relief valve includes a valve seat and a valve needle seated on said valve seat thereof and which further comprises a high pressure piston pump communicating with said piston to deliver pressurized oil thereto for moving said piston to expel primary fuel from said cylinder and communicating with an end of said valve needle of said relief valve to deliver oil thereto for biasing said valve needle thereof toward said valve seat thereof during said injection phase, and a throttle between said piston pump and said relief valve for throttling a flow of oil to said relief valve.

3. A fuel injection system as set forth in claim 2 wherein said hydraulically operated piston includes an annular groove within said cylinder and which further comprises a connecting line between said throttle and said relief valve for conveying oil therebetween and a relief duct connected to said connecting line and connected to said cylinder to communicate with said annular groove for relieving pressure on said valve needle of said relief valve with said hydraulically operated piston in a closed position.

4. A fuel injection system as set forth in claim 3 wherein said relief valve includes a loading piston coaxial of and abutting said valve needle thereof, said loading piston being disposed between said valve needle and said piston pump in parallel to said accumulator to receive pressurized oil and being of smaller diameter than said valve seat to bias said valve needle towards said valve seat.

5. A fuel injection system as set forth in claim 1 which further comprises a supply reservoir for supplying primary fuel, a collecting reservoir for receiving primary fuel and a swing pipe connected at one end to said discharge duct to receive fuel therefrom and movable between a first position at an opposite end to communicate with said supply reservoir to return primary fuel thereto and a second position to communicate with said collecting reservoir to deliver ignition oil thereto.

6. A fuel injection system as set forth in claim 5 which further comprises a second collecting reservoir for receiving ignition oil and a selector valve in said discharge duct upstream of said swing pipe for diverting a flow of ignition oil in said discharge duct to said second collecting reservoir in response to operation with ignition oil as a primary fuel.

7. A fuel injection system as set forth in claim 6 wherein said selector valve is operable with a time delay after changing from operation with ignition oil as a primary fuel to operation with a primary fuel suspension to move into a position to communicate said discharge duct with said swing pipe.

8. A fuel injection system as set forth in claim 6 wherein said selector valve includes a cylinder and a spring-biased selector piston in said cylinder movable into an actuating position to actuate said selector valve to communicate said discharge duct with said second collecting reservoir and which further comprises an oil pump for delivering ignition oil to said cylinder of said selector valve during operation with ignition oil as the primary fuel to move said selector piston into said actuating position.

9. A fuel injection system as set forth in claim 8 which further comprises a first three-way valve in said supply duct for selectively connecting said supply duct to said oil pump and a second three-way valve for selectively connecting said oil pump with one of said selector valve cylinder and a relief duct of said relief valve communicating with a supply reservoir for ignition oil.

10. A fuel injection system as set forth in claim 9 which further comprises means for actuating said three-way valves simultaneously.

11. A fuel injection system as set forth in claim 10 which further comprises an overflow duct communicating with said accumulator chamber to receive ignition oil therefrom, an adjustable regulating valve in said overflow duct to control the pressure in said accumulator chamber and a pivotable cam disc responsive to a stroke of said hydraulically operated piston to set said regulating valve, and a linkage connected to said means for actuating said three-way valves and to said swing pipe for adjusting said three-way valves and said swing pipe simultaneously, said linkage being coupled to said cam disc for movement into an emergency shut-off position with said cam disc moving into said zero position and for movement independently of said cam disc during operation of the engine.

12. A fuel injection system as set forth in claim 8 which further comprises an overflow duct communicating with said accumulator chamber to receive ignition oil therefrom, an adjustable regulating valve in said overflow duct to control the pressure in said accumulator chamber and a pivotable cam disc responsive to a stroke of said hydraulically operated piston to set said regulating valve, said cam disc having a curved portion wherein in a zero position, said disc sets said regulating valve whereby the pressure in said accumulator chamber is below a minimum injection pressure and said valve needle of said relief valve is lifted from said valve seat thereof to permit flushing of said first injection valve.

13. A fuel injection system for a combustion chamber of a reciprocating internal combustion engine comprising a first injection valve having a plurality of spray openings for injecting a primary fuel containing a suspension of solid fuel particles into the combustion chamber and a fuel chamber upstream of said openings;

a second injection valve having at least one spray opening for injecting diesel oil into the combustion chamber for ignition of the primary fuel;

an accumulator chamber for receiving diesel oil at an injection pressure at least equal to an injection pressure of the primary fuel, said chamber being in communication with said second injection valve for delivering diesel oil to said one spray opening;

a supply duct communicating with said first injection valve for delivering primary fuel to said fuel chamber;

a cylinder in said supply duct to receive primary fuel therein;

a hydraulically operated piston in said cylinder for expelling primary fuel from said cylinder into said fuel chamber of said first injection valve for injection from said plurality of spray openings during said injection phase;

a relief valve communicating with said fuel chamber of said first injection valve, said relief valve being selectively disposed in one of a closed position to block a flow of primary fuel from said fuel chamber and an open position towards an end of said injection phase thereof to exhaust a flow of primary fuel from said fuel chamber; and a discharge duct extending from said relief valve for discharging primary fuel from said relief valve.

14. A fuel injection system as set forth in claim 14 wherein said first injection valve includes a valve seat upstream of said spray openings and a valve needle seated on said valve seat and which further comprises a piston pump communicating with said piston to deliver pressurized diesel oil to said piston for moving said piston to expel primary fuel from said cylinder to said first injection valve and communicating with an end of said valve needle to deliver pressurized diesel oil thereto for biasing said valve needle toward said valve seat and against the pressure of the primary fuel during said injection phase.

15. A fuel injection system a set forth in claim 14 which further comprises a diesel oil pump upstream of said piston pump for delivering diesel oil to said piston pump and a three-way valve in said supply duct for selectively connecting said supply duct to said diesel oil pump for delivery of diesel oil to said fuel chamber of said first injection valve.

16. A fuel injection system as set forth in claim 13 which further comprises an overflow duct connected to said accumulator chamber, a regulating valve in said overflow duct to determine the pressure of oil in said accumulator chamber, and cam means for adjusting said regulating valve in dependence on the stroke of said hydraulically operated piston, said cam means including a pivotable cam disc having a curved portion with a zero position corresponding to a pressure in said accumulator chamber below a minimum injection pressure and an opening of said relief valve.

* * * * *

UNITED STATES PATENT AND TRADEMARK OFFICE
CERTIFICATE OF CORRECTION

PATENT NO. : 4,825,842

DATED : May 2, 1989

INVENTOR(S) : ANTON STEIGER

It is certified that error appears in the above-identified patent and that said Letters Patent is hereby corrected as shown below:

```
olumn 1, line 17  "Oil." should be -oil.-
olumn 1, line 20  "or with" should be -or both.  In addition, it
     has been known to provide such systems with-
olumn 2, line 43  "that" should be -that,-
olumn 2, line 57  "combustion for" should be -combustion engine
     having injection valves for-
olumn 3, line 8   "the valve" should be -the combinustion chamber
     3 at the center while a second injection valve-
olumn 4, line 4   "12;" should be -12-
olumn 4, line 23  "duct" (first occurrence) should be -ducts-
olumn 5, line 19  "of a the" should be -of the
olumn 5, line 19  "value" should be -valve-
olumn 5, line 33  "Cam" should be cam-
olumn 5, line 38  "fuel disc" should be -fuel to be injected.
     The cam disc-
olumn 7, line 16  "connected above" should be -connected-above-
olumn 7, line 47  "and" should be -then-
```

UNITED STATES PATENT AND TRADEMARK OFFICE
CERTIFICATE OF CORRECTION

| | | |
|---|---|---|
| PATENT NO. : | 4,825,842 | Page 2 of 2 |
| DATED : | May 2, 1989 | |
| INVENTOR(S) : | ANTON STEIGER | |

It is certified that error appears in the above-identified patent and that said Letters Patent is hereby corrected as shown below:

```
Column 8, line 13 "59 any" should be -59, any-
Column 9, line 45 "done in" should be -done by moving the
     coupling linkage 94 back into the position shown in-
Column 9, line 59 "Zero" should be -zero-
Column 9, line 61 "off" should be -off is-
Column 10, line 1 "highs" should be -high-
Column 10, line 23 "17" should be deleted
Column 11, line 6 "a said" should be -a flow of primary fuel from
     said-
Column 11, lines 6 and 7 "flow ... from" should be deleted
Column 13, line 12 "14" should be -13-
Column 14, line 3 "a" should be -as-
```

Signed and Sealed this

Eighth Day of October, 1991

Attest:

HARRY F. MANBECK, JR.

*Attesting Officer*       Commissioner of Patents and Trademarks